US009188444B2

(12) United States Patent  
Lafon et al.

(10) Patent No.: US 9,188,444 B2  
(45) Date of Patent: Nov. 17, 2015

(54) 3D OBJECT POSITIONING IN STREET VIEW

(75) Inventors: Stéphane Lafon, Sunnyvale, CA (US); Jie Shao, San Jose, CA (US)

(73) Assignee: Google Inc., Mountain View, CA (US)

( * ) Notice: Subject to any disclaimer, the term of this patent is extended or adjusted under 35 U.S.C. 154(b) by 501 days.

(21) Appl. No.: 13/414,351

(22) Filed: Mar. 7, 2012

(65) Prior Publication Data

US 2015/0154745 A1     Jun. 4, 2015

Related U.S. Application Data

(60) Provisional application No. 61/450,056, filed on Mar. 7, 2011.

(51) Int. Cl.
*G01C 21/00* (2006.01)
*G06T 17/05* (2011.01)
*G06F 17/30* (2006.01)

(52) U.S. Cl.
CPC ............ *G01C 21/00* (2013.01); *G06T 17/05* (2013.01); *G06F 17/30241* (2013.01); *G06T 2219/004* (2013.01)

(58) Field of Classification Search
CPC ............ G06F 17/30241; G06T 17/05; G06T 2219/004; Y10S 707/918
USPC ............ 701/450, 436, 532; 345/419; 707/918
See application file for complete search history.

(56) References Cited

U.S. PATENT DOCUMENTS

| | | | |
|---|---|---|---|
| 2008/0002893 A1* | 1/2008 | Vincent et al. | 382/229 |
| 2009/0179895 A1 | 7/2009 | Zhu et al. | |
| 2010/0250109 A1* | 9/2010 | Johnston et al. | 701/200 |

OTHER PUBLICATIONS

Breen et al.; Interactive occlusion and collision of real and virtual objects in augmented reality; European Computer Industry Research Center, 1995.*

* cited by examiner

*Primary Examiner* — Carlos Perromat
(74) *Attorney, Agent, or Firm* — Lerner, David, Littenberg, Krumholz & Mentlik, LLP

(57) ABSTRACT

Systems, methods, and computer storage mediums are provided for correcting the placement of an object on an image. An example method includes providing the image and depth data that describes the depth of the three-dimensional scene captured by the image. The depth data describes at least a distance between a camera that captured the three-dimensional scene and one or more structures in the scene and a geolocation of the camera when the three-dimensional scene was captured. When the object is moved from a first location on the image to a second location on the image, a set of coordinates that describes the second location relative to the image is received. The set of coordinates are then translated into geolocated coordinates that describe a geolocation that corresponds to the second location. The set of coordinate is translated, at least in part, using the depth data associated with the image.

16 Claims, 6 Drawing Sheets

3D OBJECT POSITIONING IN STREET VIEW

This application claims the benefit of U.S. Provisional Application No. 61/450,056, filed Mar. 7, 2011, which is incorporated herein in its entirety by reference.

FIELD

The present field generally relates to geographical information systems.

BACKGROUND

Geographical information systems provide geographic data to users including maps and various geo-referenced data associated with the maps. Some geographic information systems also provide images of three dimensional scenes on Earth. These images are often associated with data describing the scenes captured in the images, such as the depth of the scene measured from the position of the camera.

Location data for places on the map include, inter alia, names and address. In some cases, location data may not represent the most accurate information. One situation of this, for example, is where a business is located in a building with an address on one street but the entrance to the business is located on an adjacent street.

BRIEF SUMMARY

The embodiments described herein include systems, methods, and computer storage mediums for correcting the placement of an object positioned on an image. An example method includes providing the image and depth data that describes the depth of the three-dimensional scene captured by the image. The depth data describes at least a distance between a camera that captured the three-dimensional scene and one or more structures in the scene and a geolocation of the camera when the three-dimensional scene was captured. When the object is moved from a first location on the image to a second location on the image, a set of coordinates that describes the second location relative to the image is received. The set of coordinates are then translated into geolocated coordinates that describe a geolocation that corresponds to the second location. The set of coordinate is translated, at least in part, using the depth data associated with the image.

Further embodiments, features, and advantages of the invention, as well as the structure and operation of the various embodiments are described in detail below with reference to accompanying drawings.

BRIEF DESCRIPTION OF THE DRAWINGS/FIGURES

The accompanying drawings, which are incorporated herein and form a part of the specification, illustrate the present embodiments and, together with the description, further serve to explain the principles of the present invention and to enable a person skilled in the pertinent art to make and use the present invention.

The present invention is described with reference to the accompanying drawings. The drawing in which an element first appears is typically indicated by the leftmost digit or digits in the corresponding reference number.

DETAILED DESCRIPTION OF THE EMBODIMENTS

The embodiments described here include systems, methods, and computer storage mediums that allow a user to update location information for places on a map. The exemplary embodiments provide systems and methods for correcting the placement of an object overlaid on either a map, a corresponding two dimensional image that represents the three dimensional scene in the map, or both. In the detailed description of the present invention that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While the present embodiments are described herein with reference to illustrative embodiments for particular applications, it should be understood that embodiments are not limited thereto. Individuals skilled in the relevant art(s) with access to the teachings provided herein will recognize additional modifications, applications, and embodiments within the scope thereof and additional fields in that would be of significant utility.

The detailed description is divided into sections. The first section describes an example user interface that may operate in conjunction with the embodiments described herein. The second and third sections describe example system and method embodiments, respectively, for correcting the placement of an object on an image or a map. The fourth section describes an example computer system that may be used for carrying out embodiments in a computer readable medium.

Example User Interface

Figure 1A:
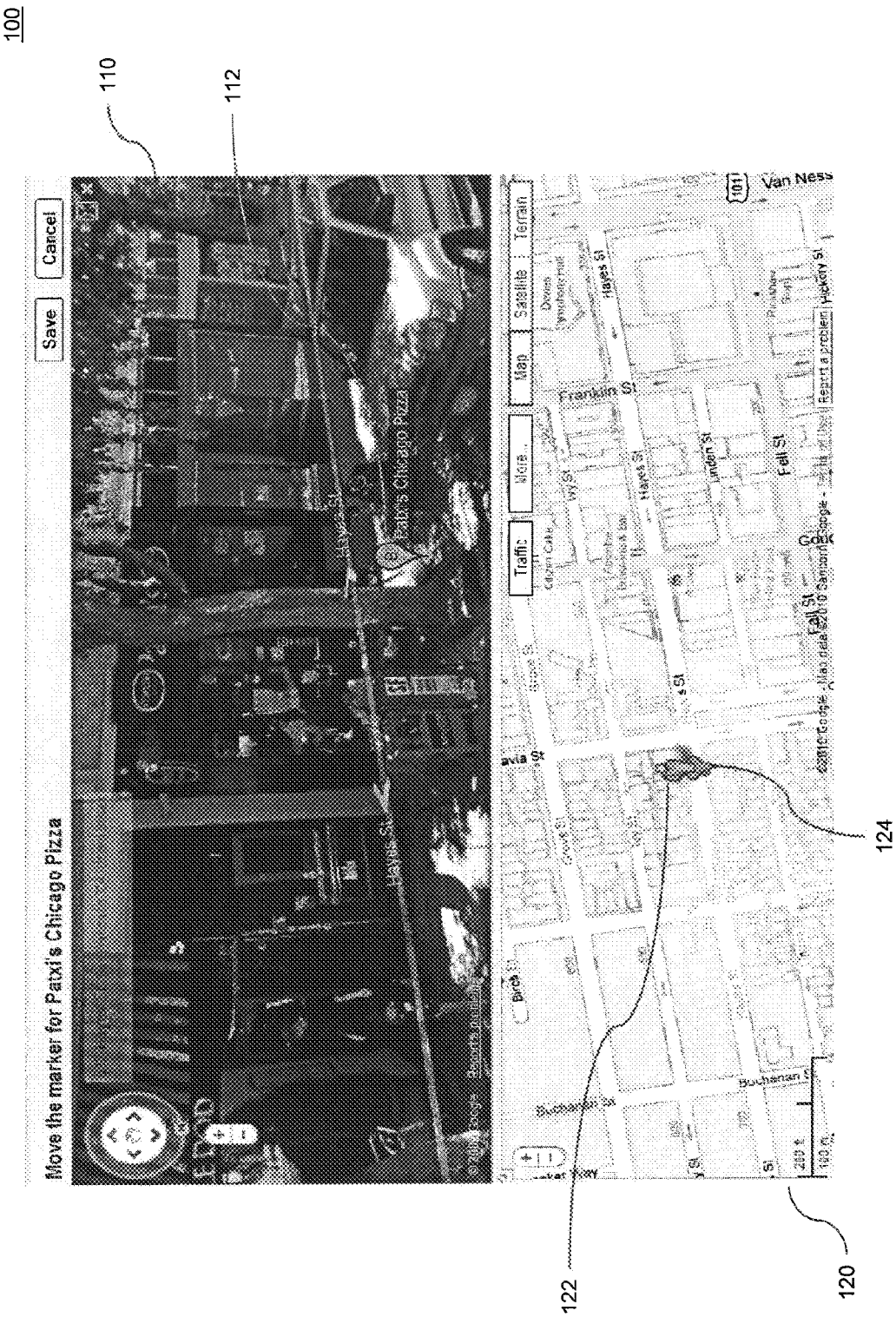
FIG. 1A illustrates an example user interface that may be used to correct the position of a location indicated on a map.

FIG. 1A illustrates an example user interface 100 that may be used to correct the position of a location indicated on a map. User interface 100 may be provided, at least in part, by map server 210 included in FIG. 2, described below. User interface 100 includes image 110, map 120, markers 112 and 122, and pegman 124. Map 120 represents a portion of a city and image 110 displays a scene captured at a specific location in the city. The specific location where image 110 was captured from is indicated on map 120 by pegman 124. The portion of the city shown in map 120 is selected, at least in part, based on a user searching for a specific location or address indicated as marker 122. Markers 112 indicates the location that corresponds to marker 122 that is captured in image 110.

User interface 100 may be configured such that markers 112 and 122 respond to user input. For example, a user may select and move marker 122 to a new location in map 120. As marker 122 is moved, the coordinates of its location relative to map 120 (e.g., x/y coordinates) may be tracked. The coordinates may then be translated to latitude/longitude coordinates.

Once the latitude/longitude coordinates are determined, they may then be used to determine the coordinates of marker 112 relative to image 110. The position of marker 112 may then be updated and provided to the user.

Similarly, a user may select and move marker 112 to a new location on image 110. As the user moves marker 112, marker 112's coordinates relative to map 110 (e.g., x/y) may be tracked. The coordinates may be used in conjunction with data describing the three-dimensional scene capture in image 110 to determine the latitude/longitude coordinates that correspond to the location of marker 112 within the scene captured in image 110. The data describing the three-dimensional scene may include, for example, the depth of the scene represented as the distance from the camera to a structure within image 110's field of view. The data may also include a separate depth value for each pixel in image 110 or a depth value for a range of pixels in image 110.

Figure 1B:
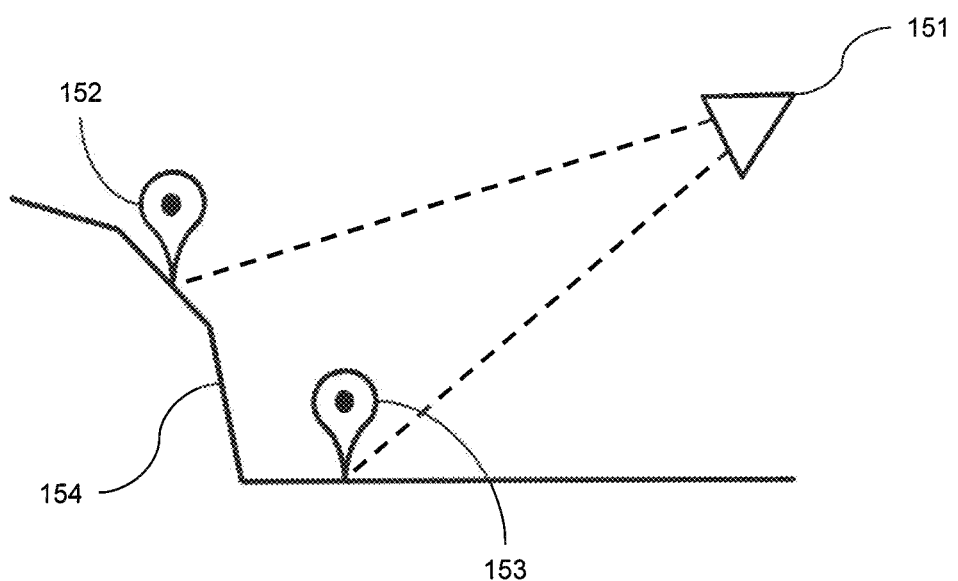
FIG. 1B illustrates an example diagram that describes a three-dimensional scene captured in a two dimensional image.

FIG. 1B illustrates an example diagram 150 that describes a three-dimensional scene captured in a two-dimensional image such as, for example, image 110. Diagram 150 includes virtual camera 151, depth,values 152 and 153, and scene 154. Each of depth values 152 and 153 may indicate the distance between the camera that captured the scene, represented by virtual camera 151, and the points indicated by depth values 152 and 153, respectively. Each of depth values 152 and 153 may correspond to either a single pixel or a group of pixels that make up the image. The points indicated by depth values 152 and 153 may be, for example, the façade of one or more structured captured in the image. Example structures may include roads, buildings, landscapes, geographic formations, or other physical objects. Some images or portions of images, however, may not capture a structure. In this case, pixels that do not correspond to a structure may be indicated by a null or zero depth value or an infinite depth value. When this occurs, either a maximum depth value or a depth value calculated from depth values of adjacent pixels may be used in determining a location of a marker when moving the marker on the image.

Depth values, including depth values 152 and 153, may be determined, for example, when the image is captured. Additional data may also be collected such as, for example, the location, orientation, and angle of the camera. This additional data may be used in conjunctions with the depth values to determine latitude/longitude coordinates for any point or pixel in the image. A person of skill in the art will readily understand how to determine latitude/longitude coordinates using the additional data and the depth values described above.

In some cases, it may be preferred to constrain the location of the marker on any one of the map or the two-dimensional image to the façade of a structure either captured in the image or represented on the map. The marker may be constrained by using, for example, the depth values to determine a maximum depth for each pixel or group of pixels that make up the scene captured in the image. Once the maximum depth is determined, a marker or other indication object may be moved along the determined maximum depth that corresponds to the façade of the structures captured in the image.

Example System Embodiments

Figure 2:
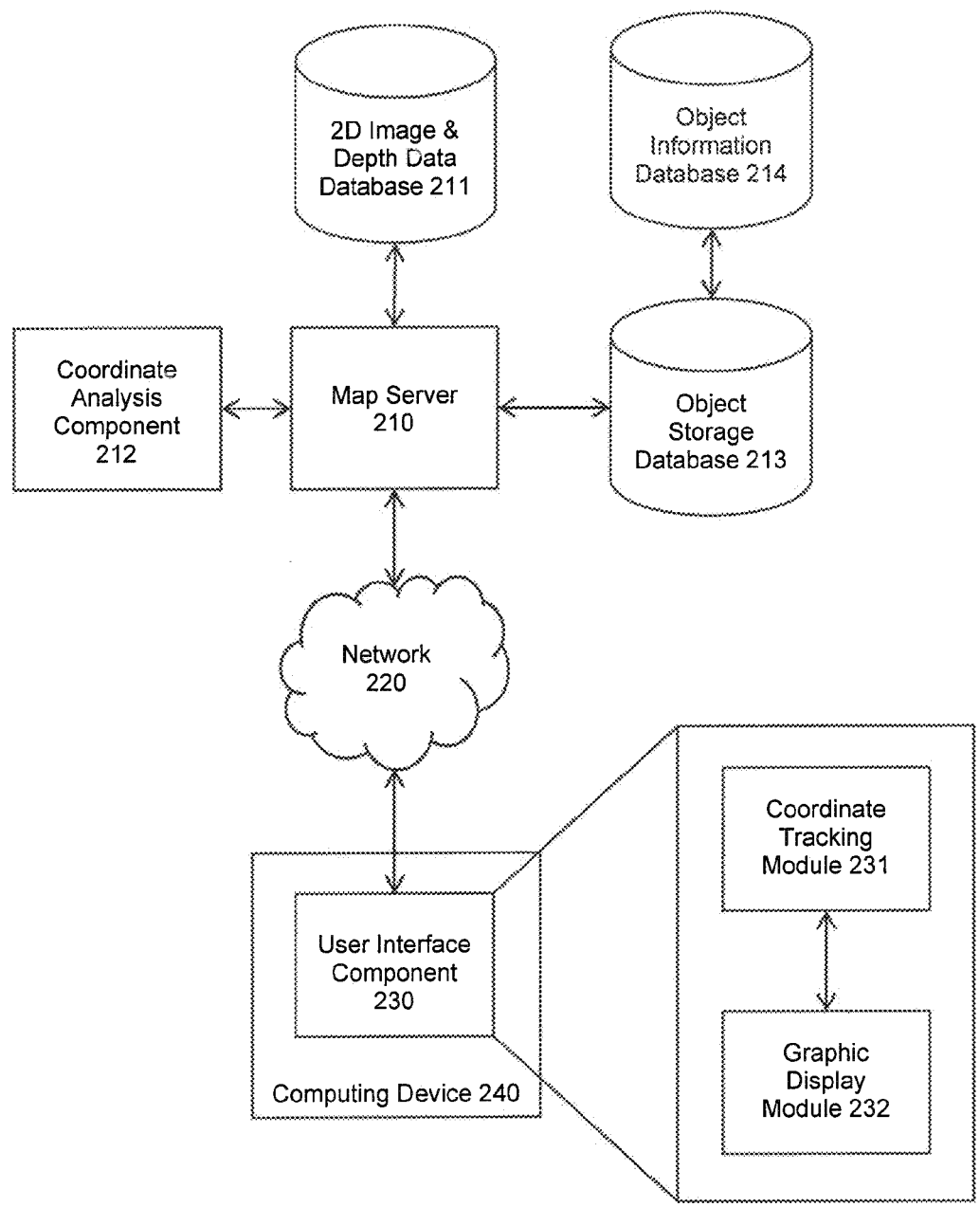
FIG. 2 illustrates an example computer system that may be used to correct the placement of an object on a two-dimensional image or a map.

FIG. 2 illustrates an example computer system 200 that may be used to correct the placement of an object (e.g., marker) on a two-dimensional image or a map. System 200 includes map server 210, 2D image & depth database 211, coordinate analysis component 212, object storage database 213, and object information database 214. Map server 210 may be implemented by any geographic information system or computer system configured to make geo-referenced data available to a client system. One of skill in the art will readily recognize that map server 210 may be implemented in software or hardware and may be placed on a network local to a client system or a remote network available through, for example, the Internet. One of skill in the art will also recognize that 2D image & depth database 211, object storage database 213, and object information database 214 may be included with the computer system that implements map server 210 or may each be positioned on one or more separate computer systems.

Map server 210 is configured to provide a variety of geo-referenced data including, for example, maps, locations that exist on the maps, images of specific locations on the maps, and information about specific locations on the maps. Map server 210 may retrieve the geo-referenced data from one or more database or file storage system such as, for example, 2D image & depth data database 211. The 2D image & depth data database 211 may be configured to provide, for example, images of geolocations or data related to the geolocations captured in the images. The 2D image & depth data database 211 may also be configured in conjunction with other databases or file systems to provide any particular set of maps, images, or other geo-referenced data that is served by map server 210.

The subject matter captured in the images of the geolocations may include, for example, buildings, landmarks, roads, or other geographic features. The images may represent a fixed field-of-view or may cover fields-of-view up to 360 degrees. Along with the images, 2D image & depth database 211, for example, may also provide data about the geolocated scene captured in an image. Examples of such data may include, for example, the location and orientation of the camera when the image was captured, the time the image was captured, or the size of the scene where the image was captured. The data regarding the size of the scene may include depth data that, for example, describes the distance from the camera to one or more points in the scene. In some embodiments, an image is captured from the street and the depth data describes the distance from the camera in the street to the front of a building directly in front of the camera lens. In some embodiments, an image is captured from the street and the depth data describes multiple distances from the camera in the street to multiple points on the front of a building directly in front of the camera lens.

Map server 210 may also server data retrieved from object storage database 213. Object storage database 213 may be configured to store the location of one or more objects that may be placed on a map. Object storage database 213 may also be configured to store the location of one or more objects placed on images of geolocations provided by map server 210. An object may include, for example, any computer generated graphic capable of displaying data on either a map or an image. Data that may be displayed may include, for example, the location of either a point on a map or a point on a corresponding two dimensional image or information about a point.

Objects may be initially set on the map based on data such as, for example, the name or address of a location indicated by the object's position. Objects may also be moved by a user to better indicate, either on a map or an image, the physical location of the place indicated by the data associated with the object such as, for example, addresses, landmarks, or other points on the map. The location (e.g., coordinates) of the objects placed on the map may be stored in an number of formats including, for example, Cartesian coordinates relative to the image or map displayed in the user interface or latitude and longitude coordinates relative to either the area covered by the map or the scene captured in the image.

In some embodiments, map server 210 may also retrieve data from object information database 214. Object information database 214 may store information corresponding to a geolocation represented on the map. This information may be generated from any publicly available source (e.g., a telephone directory) or may be generated from a private database. The information may include, for example, the name of a geolocation, the address of the geolocation, the name or address of a business at the geolocation, or any other information describing the geolocation. This information may be associated and displayed with an object that is placed on the map. This information may also be associated and displayed with an object that is placed on a corresponding image.

In some embodiments, the information may only include an address of a geolocation to be indicated by an object. The address may be used to determine where to place the object on a map. The position on the map may be determined automatically by retrieving the geolocated coordinates of the address from a database. The geolocated coordinates retrieved from the database, however, may not result in the best geolocation for the address. For example, the address associated with a geolocation on one side of a building when a better geolocation is on another side of the building. In this case, map server 210 may be configured to receive an updated geolocation for the address when, for example, the object associated with the address is moved to another position on either the map or the image.

To correct the geolocation, a user interface such as, for example, user-interface component 230 may be configured to receive input from a user that moves the object on either the map or the image. User interface component 230 may be configured to display the map and/or the corresponding image along with any objects or other geo-referenced data retrieved from map server 210. An example user interface is provided in FIG. 1A, described above. User-interface component 230 may also be configured to allow the user to pan or change the viewing scale of the map or the image.

In some embodiments, user interface component 230 may include coordinate tracking module 231 and graphic display module 232. Graphic display module 232 may be configured to display the geo-referenced data received from map server 210 and coordinate tracking module 231 may be configured to track the movement of an object as a user moves or otherwise relocates the object.

In some embodiments, user interface component 230 may include an editing mode that allows the user to select and move an object to another position on either the map or the image. The coordinates of the object relative to the user interface, for example, may be provided to coordinate analysis component 212. Coordinate analysis component 212 may be configured to receive the coordinates either while the object is being moved or upon completion of the object's movement. Coordinate analysis component 212 may then translates the received coordinates to an alternate format (e.g., Cartesian to lat/long). The coordinates of the object may be translated to an alternate format. Given the description provided herein, one of skill in the art will readily understand how to translate one coordinate system to another based on the location of an object on either the map or the corresponding image.

While system 200 shows coordinate analysis component 212 operatively connected to map server 210, coordinate analysis component 212 may optionally be includes with user interface component 230 or may be implemented to run in software executed by map server 210 or computing device 240.

In system 200, user interface component 230 interfaces with map server 210 via network 220. Network 220 may include any network or combination of networks that can carry data communication. These networks may include, for example, a local area network (LAN) or a wide area network (WAN), such as the Internet. LAN and WAN networks may include any combination of wired (e.g., Ethernet) or wireless (e.g., Wi-Fi, 3G, or 4G) network components.

Example Method Embodiments

Figure 3:
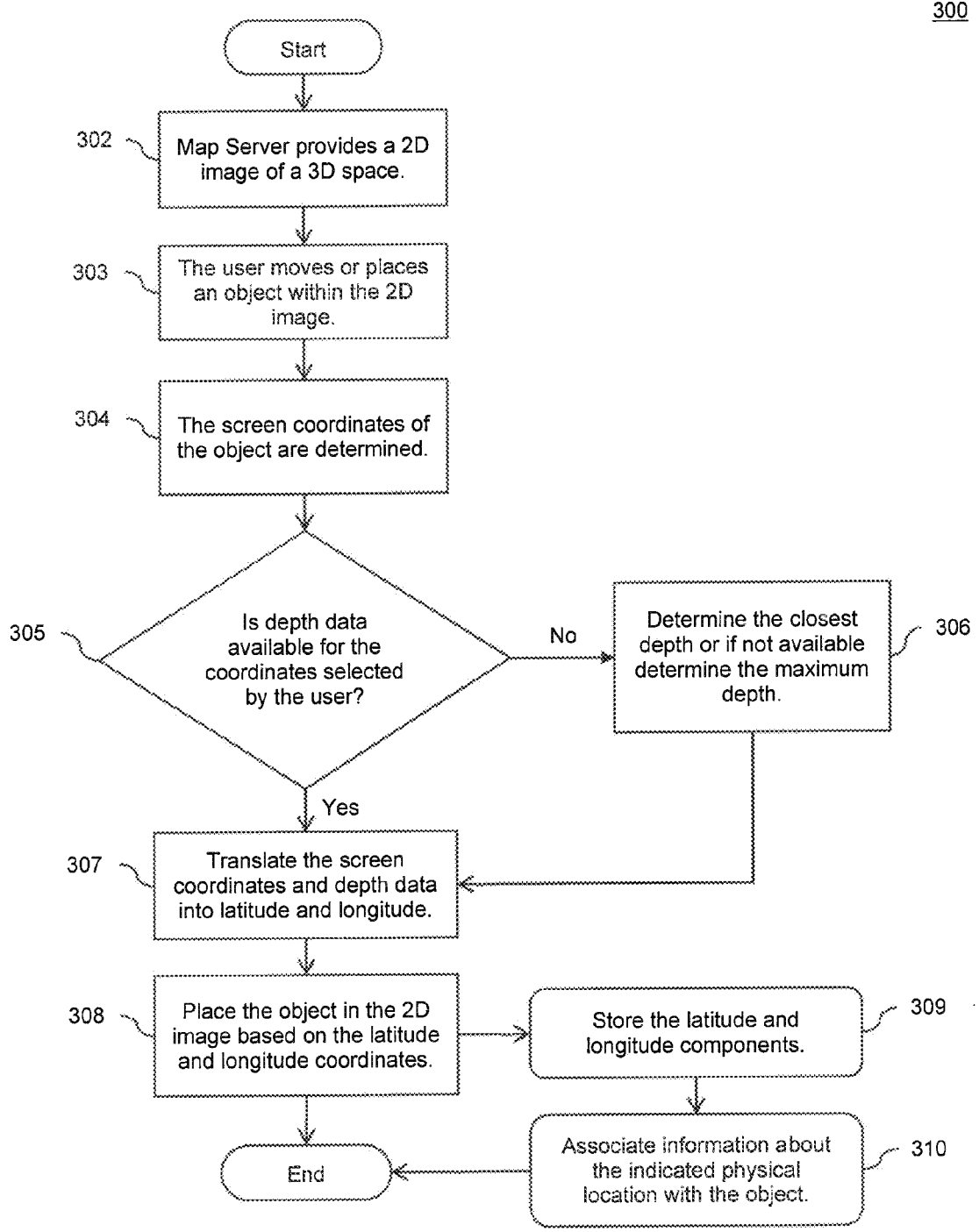
FIG. 3 illustrates an example method for placing, determining, and storing the location of an object on a two dimensional image that represents a three dimensional scene.

FIG. 3 illustrates an example method 300 for placing, determining, and storing the location of an object on a two dimensional image that represents a three dimensional scene. Method 300 may be used in operation of system 200 in FIG. 2 and may also be used simultaneously and in conjunction with method 400 in FIG. 4.

In stage 302, a map server provides content including a two dimensional image that represents a three dimensional scene. This content may be displayed to a user in either a web browser or any other client application capable of displaying images or geo-referenced data. This content may also include one or more objects that are overlaid on the displayed content. The objects may be provided with the geo-referenced data or may be created and positioned by a user. Objects may include, for example, a marker indicating the position of a specific geolocation within the image. Whether provided by the map server or created by the user, objects may be moved by the user (stage 303). If an object is moved by the user, the coordinates of the object are tracked and sent to the map server (stage 304).

Once the object's coordinates are received by the map server, the map server retrieves data describing the three dimensional scene captured by the image. The data may include depth data that describes the distance between a camera used to capture the image and one or more structures in the image. The depth data for an image, however, may be incomplete or inaccurate due to a lack of structures in the image. Thus, it will be determined whether depth data is available for the object's coordinates (stage 305). If depth data is not available for the object's coordinates, a maximum set of depth data may be used or depth data may be approximated based on adjacent coordinates (stage 306). Once depth data for the object's coordinates is either retrieved or calculated, the map server determines new latitude and longitude coordinates based on the object's coordinates and the depth data (stage 307). The object is then re-placed on the image in a location that corresponds to the new latitude and longitude coordinates (stage 308).

In some embodiments, it may be desired to not allow an object to be placed behind the façade a structure captured in an image. In this case, the coordinates of the object and the calculated latitude and longitude coordinates may differ such that the object is placed at a position on the image that is different from the position initially selected by the user. This is due to the object being constrained to the façade of the structure captured in the image. The location of the façade within the image may be determined by the depth values associated with the image.

In some embodiments, the latitude and longitude coordinates may be stored for later retrieval by one or more users (stage 309). In another embodiment, the latitude and longitude coordinates may be associated with the name, address, or other information describing the location within the image (stage 310). In another embodiment, the user may select an object with corresponding information and move the object to a location that more precisely relates to the corresponding information.

Figure 4:
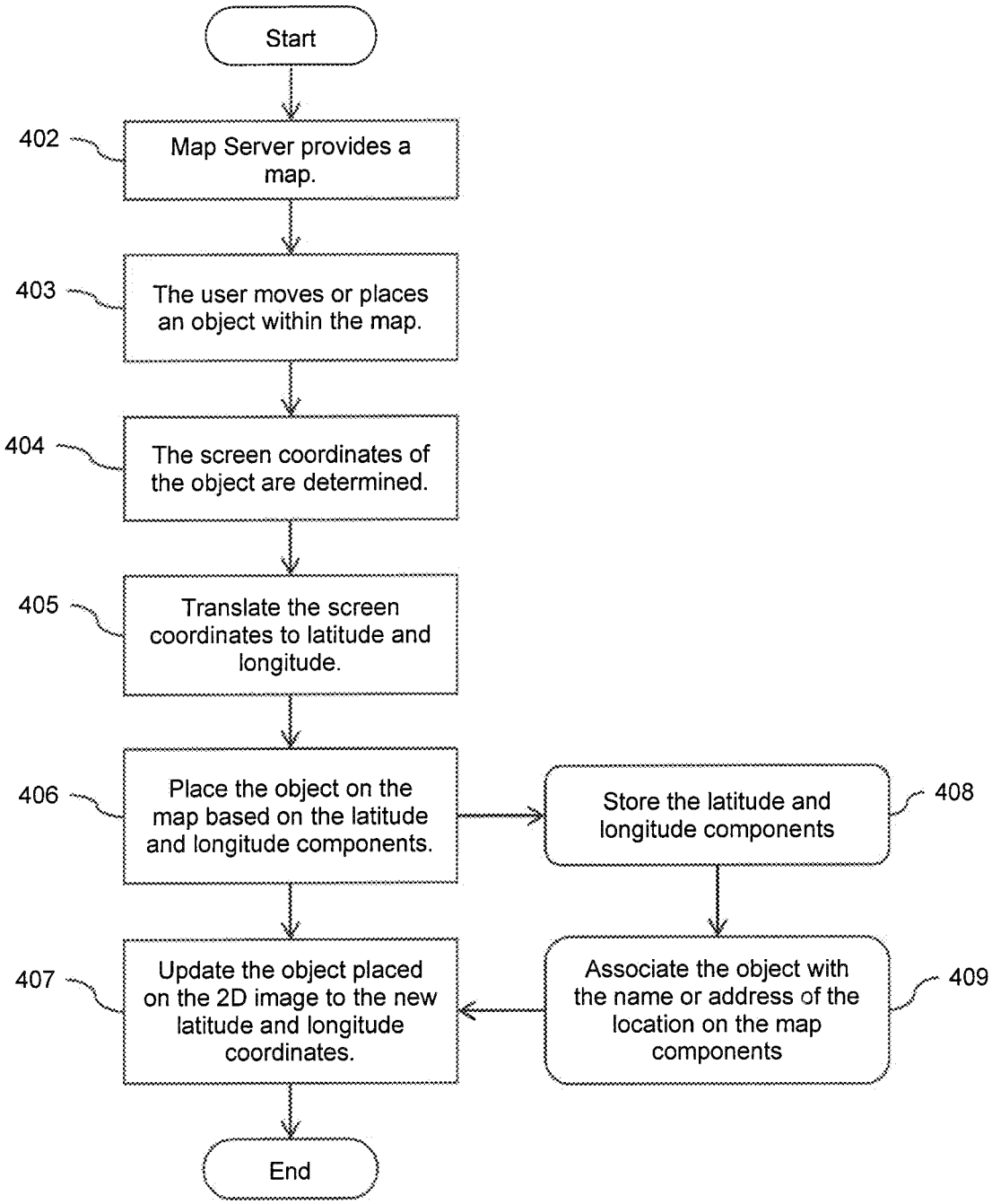
FIG. 4 illustrates an example method for placing, determining, and storing the location of an object on a map.

FIG. 4 illustrates an example method 400 for placing, determining, and storing the location of an object on a map. Method 400 may be used in operation of system 200 in FIG. 2 and may also be used simultaneously and in conjunction with method 300 in FIG. 3.

In stage 402, the map server delivers content including a map. This content may be displayed to a user in either a web browser or any other client application capable of displaying images or geo-referenced data. This content may also include one or more objects that are overlaid on the displayed content. Additionally, the user may create and position new objects on the displayed content. One example of an object is a marker indicating the position of a specific geolocation within the map. Whether provided by the map server or created by the user, objects may be moved by the user (stage 403). If an object is moved by the user, the coordinates of the object are tracked and sent to the map server (stage 404).

The map server receives coordinates of the object and translates the coordinates to latitude and longitude coordinates. If the object's coordinates are in Cartesian format (e.g., x/y coordinates) based on the object's screen position, the screen coordinates may be translated to latitude and longitude coordinates (stage 405). Methods for translating the coordinates are available to a person of skill in the art.

Once the object's coordinates are translated into latitude and longitude coordinates, the object is then re-placed on the map based on the new latitude and longitude coordinates (stage 406). Along with updating the object's position on the map, the map server may update the coordinates of an object that is placed on an image shows a scene that corresponds the geolocation of the object (stage 407). In some embodiments, this will result in the object being in the same geolocation that is selected by the user. In some embodiments, however, the latitude and longitude coordinates may differ from the coordinates selected by the user due to the object being constrained to the façade of one or more structures represented on the map. In this case, three dimensional data describing the scene in the map is used to constrain the latitude and longitude coordinates of the object so that the object cannot be placed behind the façade of the structures represented on the map.

In some embodiments, the latitude and longitude coordinates may be stored for later retrieval one or more users (stage 408). In some embodiments, the latitude and longitude coordinates may be associated with the name, address, or other information that corresponds to a geolocation on the map (stage 409). In some embodiments, the user may select an object with corresponding information and move the object to a location that more precisely relates to the corresponding information.

In some embodiments, methods 300 and 400 are simultaneously used to view and position objects on both a map and a corresponding image. In these embodiments, a first object is placed on a map at a position that corresponds to a geolocation. A second object is placed on an image that captures the real-world scene that includes the geolocation. The second object is placed at a position on the image that corresponds to the geolocation. When the user moves the first object, method 400 may be used to determine the latitude and longitude coordinates of the first object. The latitude and longitude coordinates may then be used to determine where to reposition the second object on the image so that is corresponds to the first object's position on the map. Similarly, when the user moves the second object, method 300 may be used to determine the latitude and longitude coordinates of the second object. The latitude and longitude coordinates may then be used to determine where to reposition the first object on the map so that is corresponds to the second object's position on the image.

Example Computer System

Figure 5:
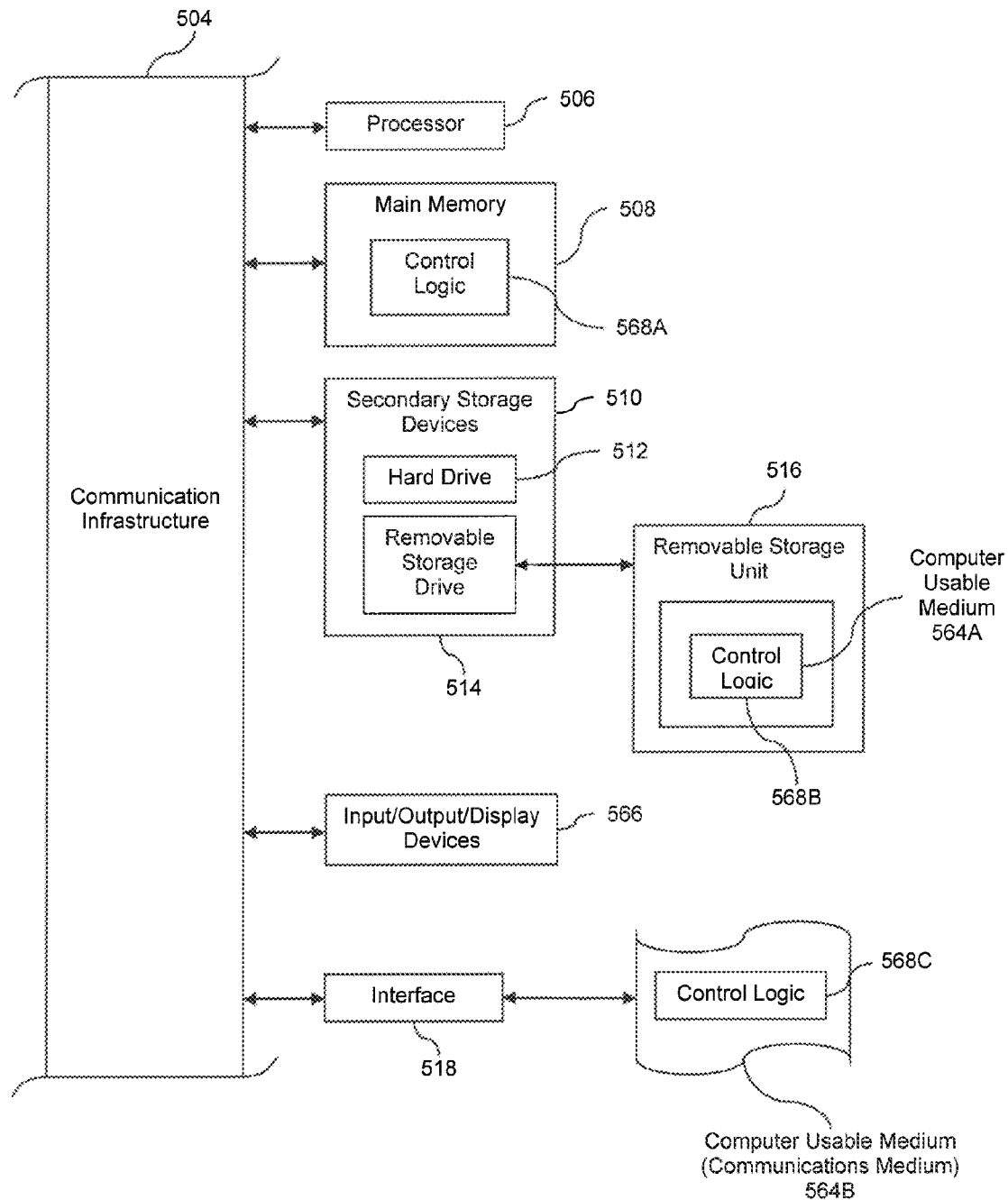
FIG. 5 illustrates a computer system useful for implementing components of the embodiments.

FIG. 5 illustrates and exemplary computer system useful for implementing components of the embodiments. For example, map server 210, 2D image and depth database 211, object storage database 213, object information database 214, or user interface component 230 may be implemented using computer(s) 500.

Computer 500 can be any commercially available and well known computer capable of performing the functions described herein, such as computers available from International Business Machines, Apple, Oracle, HP, Dell, Cray, etc.

Computer 500 includes one or more processors (also called central processing units, or CPUs), such as a processor 506. Processor 506 is connected to a communication infrastructure 504.

Computer 500 also includes a main or primary memory 508, such as random access memory (RAM). Primary memory 508 has stored therein control logic 568A (computer software), and data.

Computer 500 also includes one or more secondary storage devices 510. Secondary storage devices 510 include, for example, a hard disk drive 512 and/or a removable storage device or drive 514, as well as other types of storage devices, such as memory cards and memory sticks. Removable storage drive 514 represents a floppy disk drive, a magnetic tape drive, a compact disk drive, an optical storage device, tape backup, etc.

Removable storage drive 514 interacts with a removable storage unit 516. Removable storage unit 516 includes a computer usable or readable storage medium 564A having stored therein computer software 568B (control logic) and/or data. Removable storage unit 516 represents a floppy disk, magnetic tape, compact disk, DVD, optical storage disk, or any other computer data storage device. Removable storage drive 514 reads from and/or writes to removable storage unit 516 in a well known manner.

Computer 500 also includes input/output/display devices 566, such as monitors, keyboards, pointing devices, Bluetooth devices, etc.

Computer 500 further includes a communication or network interface 518. Network interface 518 enables computer 500 to communicate with remote devices. For example, network interface 518 allows computer 500 to communicate over communication networks or mediums 564B (representing a form of a computer usable or readable medium), such as LANs, WANs, the Internet, etc. Network interface 518 may interface with remote sites or networks via wired or wireless connections.

Control logic 568C may be transmitted to and from computer 500 via communication medium 564B.

Any tangible apparatus or article of manufacture comprising a computer usable or readable medium having control logic (software) stored therein is referred to herein as a computer program product or program storage device. This includes, but is not limited to, computer 500, main memory 508, secondary storage devices 510 and removable storage unit 516. Such computer program products, having control logic stored therein that, when executed by one or more data processing devices, cause such data processing devices to operate as described herein, represent the embodiments.

Embodiments can work with software, hardware, and/or operating system implementations other than those described herein. Any software, hardware, and operating system implementations suitable for performing the functions described herein can be used. Embodiments are applicable to both a client and to a server or a combination of both.

Conclusion

The Summary and Abstract sections may set forth one or more but not all exemplary embodiments as contemplated by the inventor(s), and thus, are not intended to limit the present embodiments and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer system for correcting the placement of an object on an image, the image representing a three dimensional geolocated scene, the computer system comprising:
   a map server component configured to provide at least the image to a user interface component;
   a coordinate analysis component configured to:
      receive a set of coordinates from the user interface component when the object is moved from a first location on the image to a second location on the image, the set of coordinates describing the second location relative to the image, and
      translate the set of coordinates into geolocated coordinates that describe a geolocation that corresponds to the second location, wherein the set of coordinate is translated, at least in part, using depth data associated with the image, the depth data describing the depth of the three-dimensional scene captured in the image and including at least a distance between a camera that captured the three-dimensional scene and one or more structures in the scene, wherein the coordinate analysis component is further configured to constrain the geolocated coordinates based, at least in part, on a maximum depth value for one or more regions of the image that do not correspond to a structure;
   a memory unit configured to store at least the coordinate analysis component; and
   a computer processor configured to execute at least the coordinate analysis component.

2. The computer system of claim 1, wherein the coordinate analysis component is further configured to associate the geolocated coordinates with geo-referenced data associated with the object.

3. The computer system of claim 2, wherein the geo-referenced data associated with the object includes at least one of a name or physical address that corresponds to the geolocated coordinates.

4. The computer system of claim 1, wherein the coordinate analysis component is further configured to determine geolocated coordinates for the first location, wherein the geolocated coordinates for the first location are determined, at least in part, from an address associated with the object's geo-referenced data.

5. The computer system of claim 1, wherein the coordinate analysis component is further configured to provide the geolocated coordinates to the user-interface component, the user-interface component configured to display at least the image and geo-referenced data associated with the image, wherein the geolocated coordinates are used, at least in part, to determine the object's position on the image.

6. The computer system of claims 1, wherein the coordinate analysis component is further configured to constrain the geolocated coordinates based, at least in part, on a depth value from the depth data that is associated one or more pixels of the image that correspond to the second location.

7. A computer-implemented method for correcting the placement of an object on an image, the image representing a three dimensional geolocated scene, the method comprising:
   providing, by at least one computer processor, the image to a user interface component;
   receiving, by the at least one computer processor and from the user interface component, a set of coordinates that indicates movement of the object from a first location to a second location relative to the image; and
   translating, by the at least one computer processor, the set of coordinates into geolocated coordinates that describe a geolocation that corresponds to the second location, wherein the set of coordinate is translated, at least in part, using the depth data associated with the image, the depth data describing the depth of the three-dimensional scene captured in the image and including at least a distance between a camera that captured the three-dimensional scene and one or more structures in the scene; wherein the translating includes constraining the geolocated coordinates based, at least in part, on a maximum depth value for one or more regions of the image that do not correspond to a structure.

8. The computer-implemented method of claim 7, further comprising:
   associating the geolocated coordinates with geo-referenced data associated with the object.

9. The computer-implemented method of claim 8, wherein the geo-referenced data associated with the object includes at least one of a name or physical address that corresponds to the geolocated coordinates.

10. The computer-implemented method of claim 7, further comprising:
    determining geolocated coordinates for the first location, wherein the geolocated coordinates for the first location are determined, at least in part, from an address associated with the object's geo-referenced data.

11. The computer-implemented method of claim 7, further comprising:
    providing the geolocated coordinates to the user-interface component, the user-interface component configured to display at least the image and geo-referenced data associated with the image, wherein the geolocated coordinates are used, at least in part, to determine the object's position on the image.

12. The computer-implemented method of claims 7, further comprising:
constraining the geolocated coordinates based, at least in part, on a depth value from the depth data that is associated one or more pixels of the image that correspond to the second location.

13. A computer-implemented method for correcting the placement of an object on a map comprising:
providing, by at least one computer processor, geo-referenced data that includes at least a map, a first object indicating a geolocation on the map, an image that captured the at least a portion of a scene that includes the geolocation, and a second object that indicates the geolocation on the image;
receiving, by at least one computer processor, a set of coordinates that describes the second object moving from a first location on the image to a second location on the image, wherein the set of coordinate are relative to the image;
coordinates based, at least in part, on depth data, wherein the depth data describes at least a distance between a camera used to capture the scene and one or more structures in the scene, the translating including constraining the geolocated coordinates based on a maximum depth value for pixels within the image that do not correspond to a structure, wherein the maximum depth value describes a maximum distance between the camera and a structure in the scene; and
providing, by at least one computer processor, the geolocated coordinates to a user interface configured to display at least the map and the first object, wherein the geolocated coordinates are used to move the first object to a location on the map that corresponds to the geolocation coordinates.

14. The computer-implemented method of claim 13, further comprising:
associating the geolocated coordinates with geo-referenced data associated with each of the first and second objects.

15. A computer system for correcting the placement of an object on a map comprising:
a map server configured to:
provide geo-referenced data that includes at least a map, a first object indicating a geolocation on the map, an image that captured at least a portion of a scene that includes the geolocation, and a second object that indicates the geolocation on the image;
receive a set of coordinates that describes the second object moving from a first location on the image to a second location on the image, wherein the set of coordinate are relative to the image;
translate the set of coordinates into geolocated coordinates based, at least in part, on depth data, wherein the depth data describes at least a distance between a camera used to capture the scene and one or more structures in the scene; and
provide the geolocated coordinates to a user interface configured to display at least the map and the first object, wherein the geolocated coordinates are used to move the first object to a location on the map that corresponds to the geolocation coordinates,
wherein the map server is further configured to constrain the geolocated coordinates value for one or more regions of the image that do not correspond to a structure based on a maximum depth value included in the depth data, wherein the maximum depth value describes a maximum distance between the camera and a structure in the scene.

16. The computer system of claim 15, wherein the map server is further configured to associate the geolocated coordinates with geo-referenced data associate with each of the first and second objects.

* * * * *